April 20, 1965 K. G. EDSMAR 3,179,146
TRACTION-AUGMENTING STUD FOR A VEHICLE TIRE
Filed March 2, 1964 2 Sheets-Sheet 1
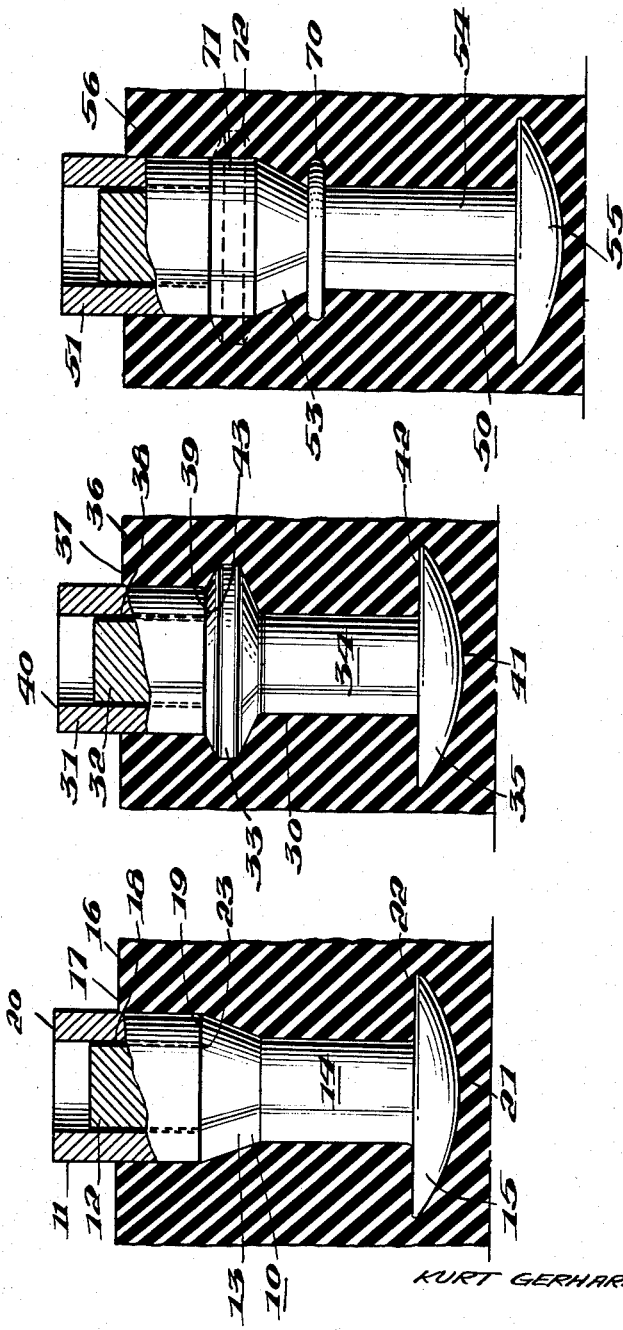
INVENTOR
KURT GERHARD EDSMAR,
BY Pierce, Scheffler & Parker
his ATTORNEYS

United States Patent Office 3,179,146
Patented Apr. 20, 1965

3,179,146
TRACTION-AUGMENTING STUD FOR A VEHICLE TIRE
Kurt Gerhard Edsmar, Stavsta, Sweden, assignor to Sandvikens Jernverks Aktiebolag, Sandviken, Sweden, a corporation of Sweden
Filed Mar. 2, 1964, Ser. No. 348,407
Claims priority, application Sweden, Mar. 15, 1963, 2,821/63; Dec. 9, 1963, 13,617/63
5 Claims. (Cl. 152—210)

The present invention relates to a traction-augmenting anti-skid stud for fastening in the wear surface of a vehicle tire and the like, the stud consisting essentially of a fastening part for attaching and holding the stud in the tire and a wear part attached to the outer end of the fastening part, said wear part being made of a wear-resistant material such as sintered metal carbide and adapted to cooperate with the road surface or ground below the tire.

Studs of this general type heretofore had been proposed in which the wear-resistant part consisted of a pin of sintered carbide protruding from a fastening part. This arrangement had, however, several disadvantages. The pin had a relatively small wear surface and consequently wore down too rapidly. The fastening part was also subjected to wear simultaneously with the pin, so that the fastening, after use for some time, lost its hold on the pin, and the pin was torn off.

An object of the present invention is to improve upon these disadvantages by making the sintered metal part tubular and fastening it on a peg protruding from the fastening part of the stud. In this way (a) there is gained a larger wear surface and (b) the fastening part is not subjected to wear, but (c) all parts of the stud which are subjected to wear are made of wear-resistant sintered carbide. The invention is characterized in that the sintered carbide part is tubular and fastened surrounding a peg protruding from the fastening part and brazed thereto. The sintered carbide part consists essentially of one or more heavy metal carbides such as tungsten carbide, as disclosed in my co-pending patent application Serial No. 348,408, filed March 2, 1964.

These and other advantages and details of the invention will appear from the following specification taken with the appended drawings in which FIG. 1 shows a partial longitudinal section through a stud according to the invention, and said stud being secured in a rubber tire;

FIG. 2 shows a modified embodiment of the stud in FIG. 1;

FIG. 3 shows another modified embodiment of the stud in FIG. 1;

Figure 4:
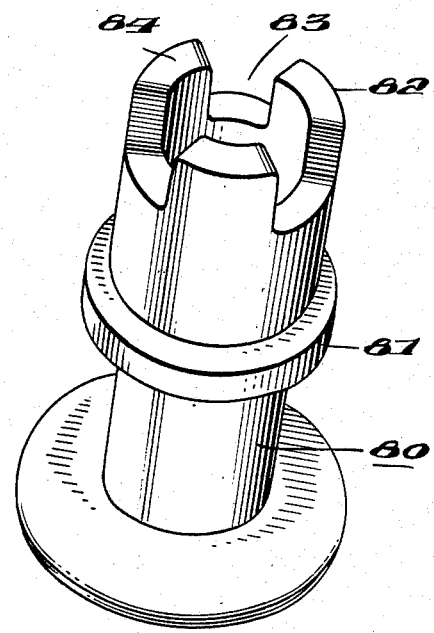
FIG. 4 shows an embodiment having a modified wear part.

The stud 10 shown in FIG. 1 comprises a tubular sintered metal carbide portion 11 and a fastening portion preferably of steel and having a peg 12, around which the tubular sintered carbide portion 11 is placed. The fastening part further comprises a conical portion 13, against the top of which the tubular part 11 rests, a cylindrical "shank" portion 14 and a head 15. The stud is countersunk in a bore formed in a rubber tire 16. The bore is originally of a smaller cross-section than that of the stud, so that the stud is resiliently held by the tire. The head 15 of the stud abuts against the bottom of the bore. The stud can thus be inserted into the tire from the outside and can be mounted in a common standard tire after making the necessary bore in its tread. The bore should have a suitable depth in the tire, so that the sintered carbide tube 11 protrudes above the wear surface 17 of the tire. A number of studs are inserted around the periphery of the tire in order to obtain a sufficient skid protection. The head 15 of the stud will, because of its wider cross-section, cooperate with the surrounding rubber to hold the stud in the tire. The end surface 21 of head 15 is rounded in order to facilitate the insertion of the stud into the bore. The opposite surface 22 of the head 15 is shown as being plane but can also be made curved or conical. By reason of the widened section of the tubular part 11 in comparison with the cylindrical or "shank" part 14 the stability of the stud is improved.

The sintered metal tube 11 has an inner section corresponding to but slightly greater than the outer section of peg 12, so that there is room for a brazing joint 18 therebetween. Said section is suitably circular. A brazing joint 19 can also be situated at the lower portion of the tube 11 where the same abuts against the conical part 13 at flange 23 of the latter. As the coefficient of expansion for steel is larger than that for sintered carbide, the peg 12 will, after the brazing, be contracted more than the tube 11, which results in permanent internal pressure stresses in the sintered carbide. This is advantageous because the sintered carbide has a higher strength against compression than against tension, and the permanent pressure stresses reduced or eliminate the occasional tensile stresses which may arise from load on the stud. The annular wear surface 20 contributes by its shape to give a good grip and gives a substantially larger wear surface than would pin-shaped carbide inserts at the same stud diameter. The fastening part is wholly protected by the sintered carbide against which the wear is directed as well in the direction outwardly at the end surface 20 as sidewardly at the mantle surface of tube 11. This construction eliminates i.a. the sideward wear from sand grains and the like which become embedded between the stud and the rubber. As the upper end of steel peg 12 is at a somewhat lower level than is the wear surface 20 of the tube, the wear surface is better exposed and there is room for the brazing metal within the tube. The brazing is preferably performed as hard brazing.

In FIG. 2 there is shown a similar stud 30 fastened in a car tire 36 or the like, details 30-32 and 34-43 corresponding to the details 10-12 and 14-23 respectively in FIG. 1. The sintered carbide tube 31 is fastened by a brazing joint 38 to the peg 32 and abuts against the surface 43, at which latter another brazing joint 39 can be situated. The cylindrical portion 34 is, as earlier described, provided with a head 35 having an end surface 41 and opposite thereto a surface 42. The sintered carbide portion protrudes in the same way as earlier above the wear surface 37 of the tire. The difference between the two figures is that in FIG. 2 the conical portion 13 of the embodiment shown in FIG. 1 is substituted by a flange portion 33 protruding outside the tube 31. This flange stabilizes the stud sidewardly and also prevents sand particles from intruding along the mantle surface of the stud.

In FIG. 3 there is shown a third embodiment. The stud 50 has a sintered metal tube 51 of the same kind as in the previous embodiments. The stud is fastened in a tire 56 and has a head 55. The flange portion below the sintered carbide portion is altered and has an extra flange 70 at the upper part of the cylindrical or "shank" portion 54. In addition to the extra flange 70 there is a conical portion 53, which is connected to a cylindrical portion 71. Instead of said cylindrical portion 71 it is possible to have a second flange portion 72 as indicated by broken lines, similar to the flange 33 in FIG. 2. The conical portion 53 can also be connected directly to the lower surface of the sintered carbide part 51 as in the embodiment shown in FIG. 1. The flange portions 70, 72 and also the earlier shown flange portion 33 have, as appears from the drawing, rounded edges in order to prevent the stud from cutting into the rubber material of the tire. By the provision of extra flange 70 there is achieved a better sideward stability.

As above mentioned, the studs can be inserted in bores in a tire. It is also possible to fasten the studs by vulcanizing, e.g., when the tire is being manufactured.

The sintered carbide part should, as can be seen from the figures, have a relatively large inner diameter in order that the peg on which it is mounted may exhibit a sufficient strength. In general the inner diameter of the sintered carbide tube should be at least as great as is the wall thickness of the tube and preferably is at least twice said wall thickness.

As an example of a stud embodying the principles of the present invention there can be mentioned a stud according to FIG. 2 having a total length of 16.5 mm., the diameter of the head being 10 mm., the diameter of the cylindrical or "shank" part 4 mm. and the diameter of the flange 7.5 mm. The sintered carbide tube has a length of 6 mm., an outer diameter of 6 mm. and an inner diameter of 3.5 mm. The peg is 1.5 mm. within the annular surface of the end surface of the sintered carbide tube, and the sintered carbide tube protrudes 2.5 mm. beyond the surface of the tire.

Figure 5:
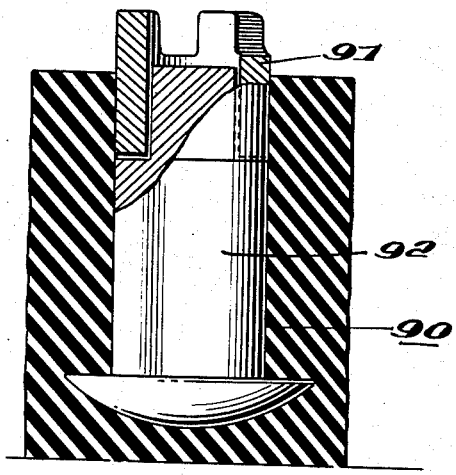
FIG. 5 shows an embodiment with the same wear part as in FIG. 4 but having a modified fastening portion.

FIGS. 4 and 5 show embodiments in which the tubular member is provided with lugs in order to improve the gripping ability of the studs. In FIG. 4 there is shown a stud 80 having a flange 81 similar to the flange 33 in FIG. 2. The upper end of the stud consists of three lugs 82 separated by recesses 83. The end wear surface of the lug thus comprises three surface portions 84. In this way the grip between the stud and the road becomes more efficient, and the desired anti-skid effect can be obtained by a smaller number of studs than with the previously described studs.

The stud 90 shown in FIG. 5 has a tubular sintered carbide portion 91 which is similar to the one shown in FIG. 4. The fastening portion has no flange immediately below the tubular member but comprises a cylindrical part 92 of the same diameter as the tubular member and supporting the tubular member at the bottom end thereof.

I claim:

1. Traction-augmenting stud for fastening in a previously formed bore in the wear surface of a vehicle tire or the like, said stud comprising a fastening part, preferably made of steel, one end of which is provided with an integral solid anchoring head having a larger diameter than the other parts of the stud, said anchoring head having a continuous end surface to which the bottom surface of such bore can conform, the opposite end of the stud being provided with a wear part of sintered carbide for cooperation with the road below the tire, characterized in that the wear portion of sintered carbide is tubular, a brazed joint securing one annular end surface of said tube to a corresponding annular support surface on and integral with a flange on the fastening part, and in that the fastening part is provided with a peg entering into the tube and fastened by a brazed joint to the inner wall of the tube.

2. Traction-augmenting stud according to claim 1, in which the flange extends radially beyond the periphery of the tube.

3. Traction-augmenting stud according to claim 1, characterized in that a separate flange remote from the tube is provided on the fastening part intermediate the tube and the head of the fastening part.

4. Traction-augmenting stud according to claim 1, characterized in that the outer end of the stud is formed with lugs protruding from the tube wall.

5. Traction-augmenting stud according to claim 4, characterized in that the lugs are integral with the tubular member and form continuations of the wall thereof, the lugs being separated by recesses in said wall.

References Cited by the Examiner
UNITED STATES PATENTS

| | | | |
|---|---|---|---|
| 1,017,732 | 2/12 | Blaisdell | 152—210 |
| 2,301,569 | 11/42 | Mucklich | 152—210 |
| 2,460,003 | 1/49 | Gemeny | 152—210 |
| 2,652,876 | 9/53 | Eisner | 152—210 |

ARTHUR L. LA POINT, *Primary Examiner.*